US008306971B2

(12) United States Patent
Stolte et al.

(10) Patent No.: US 8,306,971 B2
(45) Date of Patent: Nov. 6, 2012

(54) METHODS AND SYSTEMS OF AUTOMATICALLY GEOCODING A DATASET FOR VISUAL ANALYSIS

(75) Inventors: Christopher Richard Stolte, Seattle, WA (US); Jock Douglas Mackinlay, Bellevue, WA (US); Richard Michael Grantham Wesley, Seattle, WA (US); Ross Thomas Bunker, Seattle, WA (US); Austin David Dahl, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 693 days.

(21) Appl. No.: 12/214,659

(22) Filed: Jun. 20, 2008

(65) Prior Publication Data
US 2009/0319556 A1 Dec. 24, 2009

(51) Int. Cl.
G06F 17/30 (2006.01)
(52) U.S. Cl. ...................................................... 707/724
(58) Field of Classification Search ................... 707/724
See application file for complete search history.

(56) References Cited

U.S. PATENT DOCUMENTS

| | | | | |
|---|---|---|---|---|
| 5,383,029 | A | | 1/1995 | Kojima ........................... 358/403 |
| 5,533,107 | A | * | 7/1996 | Irwin et al. ................ 379/201.01 |
| 5,581,677 | A | | 12/1996 | Myers et al. ................... 395/140 |
| 5,864,856 | A | | 1/1999 | Young ............................ 707/100 |
| 6,058,179 | A | * | 5/2000 | Shaffer et al. ............ 379/220.01 |
| 6,301,579 | B1 | | 10/2001 | Becker ........................... 707/102 |
| 6,574,554 | B1 | * | 6/2003 | Beesley et al. ................ 701/533 |
| 6,661,884 | B2 | * | 12/2003 | Shaffer et al. ............ 379/201.02 |
| 6,674,445 | B1 | * | 1/2004 | Chithambaram et al. ..... 345/619 |
| 6,725,230 | B2 | | 4/2004 | Ruth et al. ..................... 707/102 |
| 6,750,864 | B1 | | 6/2004 | Anwar ........................... 345/440 |
| 6,928,436 | B2 | * | 8/2005 | Baudel .............................. 1/1 |
| 6,954,764 | B2 | * | 10/2005 | Biswas et al. ........................ 1/1 |
| 7,035,843 | B1 | * | 4/2006 | Bellamkonda et al. ............... 1/1 |
| 7,089,266 | B2 | * | 8/2006 | Stolte et al. ................... 707/769 |
| 7,162,484 | B2 | * | 1/2007 | Grobler et al. ....................... 1/1 |
| 7,379,601 | B2 | | 5/2008 | Yang et al. .................... 382/224 |
| 7,467,109 | B1 | * | 12/2008 | Simon et al. ................ 705/36 R |
| 7,467,125 | B2 | * | 12/2008 | Khatchatrian et al. ............... 1/1 |
| 7,480,663 | B2 | * | 1/2009 | Colossi et al. ....................... 1/1 |
| 7,483,880 | B2 | * | 1/2009 | Rossi et al. ......................... 1/1 |

(Continued)

OTHER PUBLICATIONS

Stolte, C.; Tang, D.; Hanrahan, P.; , "Polaris: a system for query, analysis, and visualization of multidimensional relational databases," Visualization and Computer Graphics, IEEE Transactions on , vol. 8, No. 1, pp. 52-65, Jan./Mar. 2002 doi: 10.1109/2945.981851 URL: http://ieeexplore.ieee.org/stamp/stamp.jsp?tp=&arnumber=981851&isnumber=21152.*

*Primary Examiner* — Mark Andrew X Radtke
(74) *Attorney, Agent, or Firm* — Morgan, Lewis & Bockius LLP

(57) ABSTRACT

A computer-implemented method of generating a map view includes accessing a dataset having multiple records and multiple fields. One or more of the multiple fields are identified as geographical fields. Geographical codes are automatically associated with a first one of the identified geographical fields. A geographical map is generated for the dataset. Generating the geographical map includes generating a first plurality of marks on the geographical map. The first plurality of marks is positioned on the geographical map in accordance with the geographical codes associated with the first one of the identified geographical fields.

24 Claims, 11 Drawing Sheets
(3 of 11 Drawing Sheet(s) Filed in Color)

U.S. PATENT DOCUMENTS

| | | | |
|---|---|---|---|
| 7,499,046 B1* | 3/2009 | Wright et al. | 345/418 |
| 7,546,312 B1* | 6/2009 | Xu et al. | 1/1 |
| 7,559,023 B2* | 7/2009 | Hays et al. | 715/255 |
| 7,659,895 B2* | 2/2010 | Kandogan | 345/440 |
| 7,703,028 B2* | 4/2010 | Tomlyn | 715/764 |
| 7,707,143 B2* | 4/2010 | Bruce et al. | 707/999.003 |
| 7,707,490 B2* | 4/2010 | Hays et al. | 715/234 |
| 7,716,167 B2* | 5/2010 | Colossi et al. | 707/714 |
| 7,716,173 B2* | 5/2010 | Stolte et al. | 707/600 |
| 7,747,598 B2* | 6/2010 | Buron et al. | 707/705 |
| 7,756,907 B2* | 7/2010 | Stolte et al. | 707/805 |
| 7,778,993 B2* | 8/2010 | Sacco | 707/705 |
| 7,800,613 B2* | 9/2010 | Hanrahan et al. | 345/440 |
| 7,912,837 B2* | 3/2011 | Buron et al. | 707/723 |
| 8,032,484 B2* | 10/2011 | Godoy et al. | 707/602 |
| 8,055,691 B2* | 11/2011 | Delgaudio et al. | 707/829 |
| 8,117,245 B2* | 2/2012 | DelGaudio et al. | 707/829 |
| 2002/0057283 A1* | 5/2002 | Biswas et al. | 345/700 |
| 2004/0172466 A1* | 9/2004 | Douglas et al. | 709/224 |
| 2004/0183800 A1 | 9/2004 | Peterson | 345/440 |
| 2004/0243593 A1* | 12/2004 | Stolte et al. | 707/100 |
| 2005/0060300 A1 | 3/2005 | Stolte et al. | 707/3 |
| 2005/0099423 A1 | 5/2005 | Brauss | 345/440 |
| 2005/0102101 A1* | 5/2005 | Beesley et al. | 701/209 |
| 2005/0108057 A1* | 5/2005 | Cohen et al. | 705/3 |
| 2005/0228688 A1* | 10/2005 | Visser et al. | 705/1 |
| 2005/0261928 A1* | 11/2005 | Skeadas | 705/1 |
| 2006/0069693 A1* | 3/2006 | DelGaudio et al. | 707/101 |
| 2006/0206512 A1* | 9/2006 | Hanrahan et al. | 707/102 |
| 2006/0211404 A1* | 9/2006 | Cromp et al. | 455/405 |
| 2006/0259509 A1* | 11/2006 | Stolte et al. | 707/102 |
| 2007/0061611 A1* | 3/2007 | Mackinlay et al. | 714/5 |
| 2007/0239527 A1* | 10/2007 | Nazer et al. | 705/14 |
| 2007/0288312 A1* | 12/2007 | Wang | 705/14 |
| 2007/0294275 A1* | 12/2007 | Delgaudio et al. | 707/101 |
| 2008/0167794 A1* | 7/2008 | Fuchs et al. | 701/117 |
| 2008/0176583 A1* | 7/2008 | Brachet et al. | 455/456.3 |
| 2008/0177464 A1* | 7/2008 | Fuchs et al. | 701/202 |
| 2008/0215524 A1* | 9/2008 | Fuchs et al. | 707/1 |
| 2008/0243876 A1* | 10/2008 | Godoy et al. | 707/100 |
| 2009/0085806 A1* | 4/2009 | Piersol et al. | 342/386 |
| 2009/0262131 A1* | 10/2009 | Suntinger et al. | 345/619 |
| 2009/0319891 A1* | 12/2009 | MacKinlay et al. | 715/275 |

* cited by examiner

| Store ID ⌐102 | City ⌐104 | State ⌐106 | Market ⌐108 | Inventory ⌐110 | Type ⌐112 | ... |
|---|---|---|---|---|---|---|
| 1 | Seattle | WA | Northwest | 632 | Decaf | ... 122-1 |
| 1 | Seattle | WA | Northwest | 854 | Regular | ... 122-2 |
| 2 | Portland | OR | Northwest | 548 | Decaf | ... 122-3 |
| 2 | Portland | OR | Northwest | 682 | Regular | ... 122-4 |
| 3 | Los Angeles | CA | West | 720 | Decaf | ... 122-5 |
| 3 | Los Angeles | CA | West | 594 | Regular | ... 122-6 |
| 4 | San Diego | CA | West | 668 | Decaf | ... 122-7 |
| 4 | San Diego | CA | West | 371 | Regular | ... 122-8 |
| 5 | Chicago | IL | Midwest | 593 | Decaf | ... 122-9 |
| 5 | Chicago | IL | Midwest | 611 | Regular | ... 122-10 |
| 6 | St. Louis | MO | Midwest | 486 | Decaf | ... 122-11 |
| 6 | St. Louis | MO | Midwest | 518 | Regular | ... 122-12 |
| ... | ... | ... | ... | ... | ... | ... |

Dataset 100

Figure 1

State Level Table 200

| Row ID (202) | Parent ID (204) | Name (206) | Abbreviation (208) | ... | |
|---|---|---|---|---|---|
| 1 | 1 | California | CA | ... | 210-1 |
| 2 | 1 | Illinois | IL | ... | 210-2 |
| 3 | 1 | Missouri | MO | ... | 210-3 |
| 4 | 1 | Oregon | OR | ... | 210-4 |
| 5 | 1 | Washington | WA | ... | 210-5 |

Figure 2A

City Level Table 220

| Row ID (222) | Parent ID (224) | Name (226) | ... | |
|---|---|---|---|---|
| 1 | 2 | Chicago | ... | 230-1 |
| 2 | 1 | Los Angeles | ... | 230-2 |
| 3 | 4 | Portland | ... | 230-3 |
| 4 | 1 | San Diego | ... | 230-4 |
| 5 | 5 | Seattle | ... | 230-5 |
| 6 | 3 | St. Louis | ... | 230-6 |

Figure 2B

Fact Table 240

| Row ID | Parent ID | Latitude | Longitude | ••• | |
|---|---|---|---|---|---|
| 1 | 1 | 41.8 | -87.6 | ••• | 250-1 |
| 2 | 2 | 34.0 | -118.2 | ••• | 250-2 |
| 3 | 3 | 45.5 | -122.7 | ••• | 250-3 |
| 4 | 4 | 32.7 | -117.2 | ••• | 250-4 |
| 5 | 5 | 47.6 | -122.3 | ••• | 250-5 |
| 6 | 6 | 38.6 | -90.2 | ••• | 250-6 |

Figure 2C

Heuristics Table 260

| Row ID | Level | Pattern | Data Type | Width | ••• | |
|---|---|---|---|---|---|---|
| 1 | [State].[Name] | '^STATE.*' | String | 40 | ••• | 272-1 |
| 2 | [State].[Abbreviation] | '^STATE.*' | String | 2 | ••• | 272-2 |
| 3 | [City].[Name] | '^CITY.*' | String | 50 | ••• | 272-3 |

Figure 2D

| Store ID 102 | City 104 | State 106 | Market 108 | Inventory 110 | Type 112 | Latitude-y 116 | Longitude-x 118 | |
|---|---|---|---|---|---|---|---|---|
| 1 | Seattle | WA | Northwest | 632 | Decaf | 47.6 | -122.3 | ... 122-1 |
| 1 | Seattle | WA | Northwest | 854 | Regular | 47.6 | -122.3 | ... 122-2 |
| 2 | Portland | OR | Northwest | 548 | Decaf | 45.5 | -122.7 | ... 122-3 |
| 2 | Portland | OR | Northwest | 682 | Regular | 45.5 | -122.7 | ... 122-4 |
| 3 | Los Angeles | CA | West | 720 | Decaf | 34.0 | -118.2 | ... 122-5 |
| 3 | Los Angeles | CA | West | 594 | Regular | 34.0 | -118.2 | ... 122-6 |
| 4 | San Diego | CA | West | 668 | Decaf | 32.7 | -117.2 | ... 122-7 |
| 4 | San Diego | CA | West | 371 | Regular | 32.7 | -117.2 | ... 122-8 |
| 5 | Chicago | IL | Midwest | 593 | Decaf | 41.8 | -87.6 | ... 122-9 |
| 5 | Chicago | IL | Midwest | 611 | Regular | 41.8 | -87.6 | ... 122-10 |
| 6 | St. Louis | MO | Midwest | 486 | Decaf | 38.6 | -90.2 | ... 122-11 |
| 6 | St. Louis | MO | Midwest | 518 | Regular | 38.6 | -90.2 | ... 122-12 |
| ... | ... | ... | ... | ... | ... | ... | ... | ... |

Dataset 130

Figure 2E

Result Set 280

| City | Inventory | Latitude-y | Longitude-x | ... | |
|---|---|---|---|---|---|
| Seattle | 1486 | 47.6 | -122.3 | ... | 290-1 |
| Portland | 1230 | 45.5 | -122.7 | ... | 290-3 |
| Los Angeles | 1314 | 34.0 | -118.2 | ... | 290-5 |
| San Diego | 1039 | 32.7 | -117.2 | ... | 290-7 |
| Chicago | 1204 | 41.8 | -87.6 | ... | 290-9 |
| St. Louis | 1004 | 38.6 | -90.2 | ... | 290-11 |

(columns: 282, 284, 286, 288)

Figure 2F

METHODS AND SYSTEMS OF AUTOMATICALLY GEOCODING A DATASET FOR VISUAL ANALYSIS

RELATED APPLICATIONS

This application is related to U.S. patent application Ser. No. 11/005,652, titled "Computer Systems and Methods for Visualizing Data with Generation of Marks," filed Dec. 2, 2004, which is hereby incorporated by reference in its entirety.

TECHNICAL FIELD

The disclosed embodiments relate generally to generating map views of data, and more specifically to adding geographical coding automatically to data to enable generation of map views.

BACKGROUND

Map views provide user-friendly ways to analyze data by displaying geographical variation of data. Creation of map views may be enabled by adding location fields such as latitude and longitude to a dataset, which is referred to as geocoding the data. Geocoding data presents significant obstacles: users may not know latitude and longitude values for their data, may not have time to perform geocoding, and may not have write permission on their dataset. Furthermore, users may desire to geocode data by multiple geographical levels (e.g., by state, county, and ZIP code).

SUMMARY

In some embodiments, a computer-implemented method of generating a map view includes accessing a dataset having multiple records and multiple fields. One or more of the multiple fields are identified as geographical fields. Geographical codes are automatically associated with a first one of the identified geographical fields. A geographical map is generated for the dataset. Generating the geographical map includes generating a first plurality of marks on the geographical map. The first plurality of marks is positioned on the geographical map in accordance with the geographical codes associated with the first one of the identified geographical fields.

In other embodiments, a system for generating a map view includes memory, one or more processors, and one or more programs stored in the memory and configured for execution by the one or more processors. The one or more programs include: instructions to access a dataset having multiple records and multiple fields, instructions to identify one or more of the multiple fields as geographical fields, and instructions to automatically associate geographical codes with a first one of the identified geographical fields. The one or more programs also include instructions to generate a geographical map for the dataset, including instructions to generate a first plurality of marks on the geographical map. The first plurality of marks is positioned on the geographical map in accordance with the geographical codes associated with the first one of the identified geographical fields.

In yet other embodiments, a computer readable storage medium stores one or more programs for use in generating a map view. The one or more programs are configured to be executed by a computer system and include: instructions to access a dataset having multiple records and multiple fields, instructions to identify one or more of the multiple fields as geographical fields, and instructions to automatically associate geographical codes with a first one of the identified geographical fields. The one or more programs also include instructions to generate a geographical map for the dataset, including instructions to generate a first plurality of marks on the geographical map. The first plurality of marks is positioned on the geographical map in accordance with the geographical codes associated with the first one of the identified geographical fields.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a conceptual block diagram of a prophetic example of a dataset having multiple records and multiple fields in accordance with some embodiments.

FIGS. 2A and 2B are conceptual block diagrams of prophetic examples of level tables for levels in a geographical hierarchy in accordance with some embodiments.

FIG. 2C is a conceptual block diagram of a prophetic example of a fact table for a geographical hierarchy in accordance with some embodiments.

FIG. 2D is a conceptual block diagram of a prophetic example of a table that defines heuristics used to identify fields in a dataset as geographical fields in accordance with some embodiments.

FIG. 2E is a conceptual block diagram of a prophetic example of a geocoded dataset in accordance with some embodiments.

FIG. 2F is a conceptual block diagram of a prophetic example of a geocoded result set in accordance with some embodiments.

Like reference numerals refer to corresponding parts throughout the drawings.

DESCRIPTION OF EMBODIMENTS

Figure 3A:
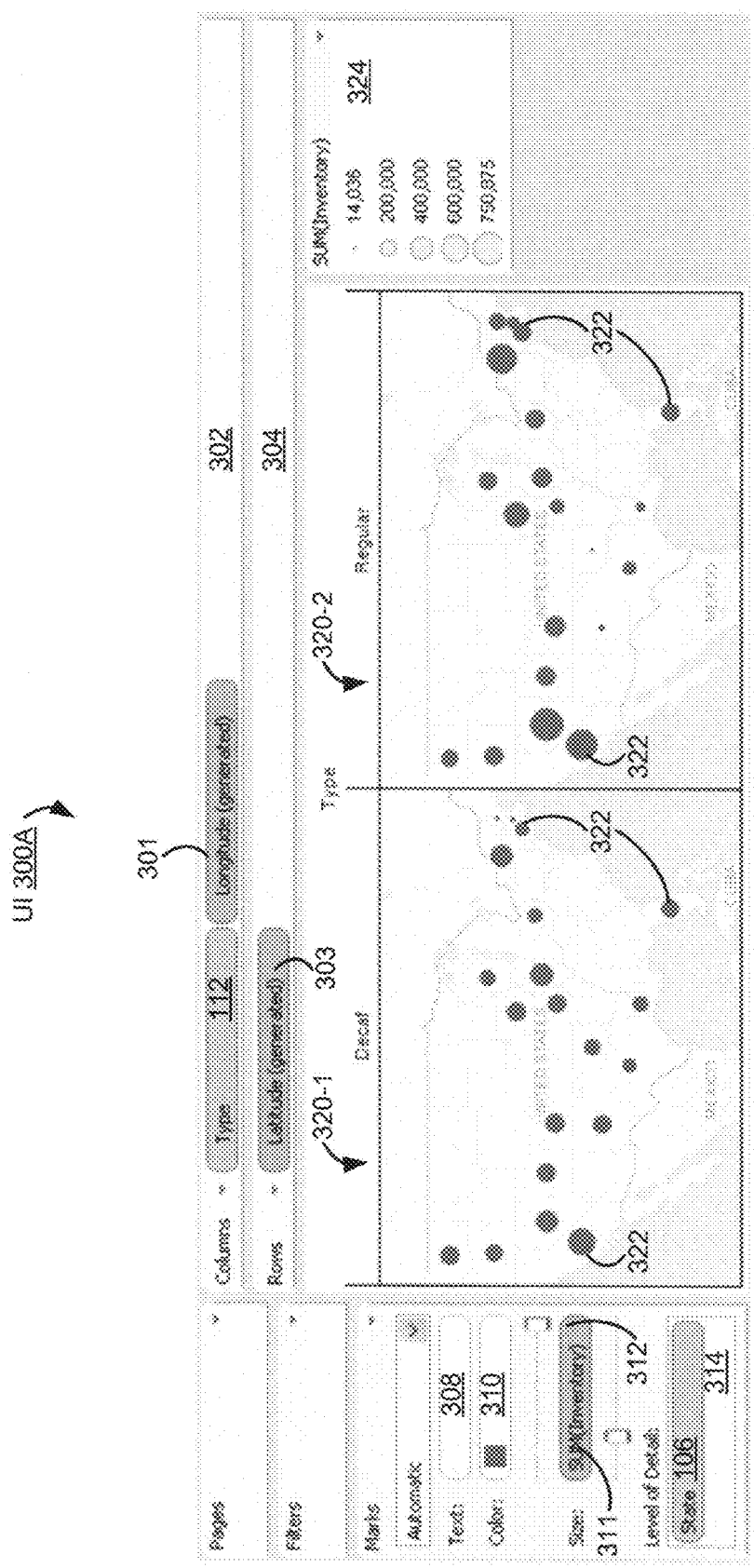
FIGS. 3A-3C are screenshots of a user interface for displaying a geographical map in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

To generate map views, a user of a data analysis software application first accesses a dataset containing data to be analyzed. The dataset includes multiple records and multiple fields, including fields with data to be analyzed and fields with corresponding geographical information, referred to as geographical fields. The geographical information specifies geographical areas corresponding to the data to be analyzed. The term "geographical area" as used herein can include both geographical regions and geographical locations. For example, the geographical information may include one or more of the following fields: country; state or province; state or provincial capital; county or parish; Metropolitan Statistical Area (MSA); Core Based Statistical Area (CBSA); Designated Market Area (DMA); arbitrarily defined market region; school, congressional, or other district; address; city; street; street number; and ZIP code or other postal code. In some embodiments the geographical information is stored using Federal Information Processing Standards (FIPS) codes. Inclusion of fields specifying geographical areas allows data to be analyzed with respect to the specified geographical areas, thus permitting the user to study variation of raw data, or of parameters calculated from raw data, across the specified geographical areas.

The dataset may be stored in any appropriate arrangement and location. For example, the dataset may be stored in a table or in a database containing multiple tables. The database may be stored locally or remotely.

As used herein, the term "location fields" refers to fields that specify map coordinates corresponding to one or more geographical fields An example of map coordinates is latitude and longitude values, although the map coordinates may be any set of coordinates capable of being mapped. A dataset with location fields is said to be geocoded, and adding location fields to a dataset is referred to as geocoding the dataset. Similarly, adding location fields to a result set generated from a dataset is referred to as geocoding the result set.

To enable creation of map views of data in a dataset, location fields may be automatically added to the dataset or to a result set generated from the dataset. The result set may be generated, for example, by querying the dataset. Adding location fields to a result set allows a user who lacks write permission for the dataset to generate map views of data from the dataset. Adding location fields to a result set instead of a dataset also may offer performance advantages, since a result set may be significantly smaller (e.g., may have significantly fewer records) than its corresponding dataset and thus may be geocoded more quickly than its corresponding dataset. Adding location fields to a result set also allows the level of geocoding to be adjusted dynamically: instead of being limited to those location fields that are included in the dataset, location fields may be added to the result set for any geographical field(s) and the determination of which geographical field(s) the geocoding is to be based on may be made on the fly.

To add location fields to a dataset or corresponding result set automatically, one or more of the original fields in the dataset are identified as geographical fields, as described in detail below. A set of coordinates is accessed that includes coordinates for geographical areas listed in respective records of an identified geographical field. The respective records in the dataset, or corresponding records in the result set, are updated to include coordinates that correspond to respective geographical areas listed in the identified geographical field(s) of the records. For example, the set of coordinates may be stored in a table and a join operation between the table and the dataset or result set may be performed.

In some embodiments, data analysis software for generating map views specifies one or more geographical hierarchies. A geographical hierarchy is an ordered set of levels of geographical information. An example of a geographical hierarchy is (Country, State/Province, County/Parish, City, ZIP Code/Post Code, Street, Street Number). In this example, "Country" is one level, "State/Province" is another level, and so forth. The levels in a geographical hierarchy are arranged in order of increasing detail. However, there may be overlap between successive levels in a geographical hierarchy. For example, in the hierarchy (State, MSA, City), there is potential overlap between the "State" and "MSA" levels, because an MSA may cross state boundaries. Two successive levels of increasing detail are referred to as parent and child levels; the child level is more detailed than the parent level. For example, in the hierarchy (State, County) county is a child level of state and state is a parent level of county. A parent level may have multiple child levels. For example, a zip code level and a county level both may be children of a state level. Associated with each geographical hierarchy is a set of coordinates for geographical areas at the most detailed level of the hierarchy, and possibly also for other levels of the hierarchy.

In some embodiments, identifying a field in a dataset or result set as a geographical field includes determining that the field corresponds to a level in a geographical hierarchy. Once this determination has been made, the coordinates associated with the geographical hierarchy are used to geocode the dataset or result set. In some embodiments, if a dataset or result set includes multiple geographical fields corresponding to multiple respective levels in a geographical hierarchy, the most detailed level in the geographical hierarchy is used to determine the coordinates to be added to the dataset or result set. In some embodiments, the level that has the largest number of distinct values as stored in a local table (e.g., a level table 200 or 220, FIGS. 2A-2B below) is used to determine the coordinates. In some embodiments, to decide between two geographical fields that both correspond to equivalent levels of detail in a hierarchy (e.g., the two fields correspond to distinct levels that are both children of a particular parent level), a "detail number" for each geographical field is calculated and the level corresponding to the geographical field with the highest detail number is used for geocoding. The detail number is defined as the largest number of values in the geographical field associated with a particular geographical area in the parent field. For example, if zip code is a child level of state, then the zip code detail number is the number of zip codes in the state with the largest number of zip codes. These rules result in selection of a geographical field for geocoding that is likely to be the most relevant geographical field for the user.

In some embodiments, a user may manually identify a field as a geographical field by providing input that specifies that the field is geographical. For example, the user may specify that a field is geographical through a dialog initiated by right-clicking on a listed field in a user interface or by selecting a command from a drop-down menu.

Alternatively, a field may automatically be identified as geographical. Various techniques for automatically identifying a field as a geographical field are available. In some embodiments, the schema of the dataset is queried for metadata specifying that a field is a geographical field. For example, if a field in the dataset has semantic metadata that matches semantic metadata describing a level in a geographical hierarchy, the field is automatically identified as a geographical field that corresponds to the level in the hierarchy. In some embodiments, the name of a field is used to identify the field as a geographical field.

In some embodiments, values in a field are sampled and the sampled values compared to known geographical areas, such as geographical areas associated with various levels in a geographical hierarchy. If at least a predetermined percentage (e.g., 80%) of the sampled values corresponds to known geographical areas (e.g., known geographic areas associated with a particular level in a geographical hierarchy), the field is automatically identified as a geographical field. Automatically identifying a field as a geographical field also may include verifying various expected field attributes, such as verifying that the data type matches an expected type for a particular geographical field and verifying that the width of the field is equal to, or greater than or equal to, an expected width for a particular geographical field.

Attention is now directed to data structures associated with automatic geocoding.

FIG. 1 is a conceptual block diagram of a prophetic example of a dataset 100 having multiple records 122-1 through 122-12 and multiple fields 102 through 112 in accordance with some embodiments. The dataset 100 is shown as a single table for visual clarity but in some embodiments may correspond to multiple tables in a database or to any other appropriate arrangement. The dataset 100 lists data for a hypothetical coffee business with stores throughout the country. Each record 122 corresponds to a particular store, as specified by a store ID 102 and a particular type of coffee 112 (e.g., regular or decaf). Each record 122 includes an inventory 110 for a type of coffee at each store and includes several geographical fields, such as the city 104, state 106, and regional market 108 for each store. The dataset 100 is not geocoded, however: it does not contain location fields. In addition to the fields 102 through 112 shown in FIG. 1, the dataset 100 could include other fields. For example, the dataset 100 could include additional business data (e.g., sales and profits) for each combination of store ID 102 and coffee type 118 and additional geographical fields (e.g., street, street number, and ZIP code of each store). The dataset 100 also could include location fields, the presence of which does not preclude geocoding the dataset 100 or an associated result set with additional location fields.

FIGS. 2A-2C illustrate data structures associated with a geographical hierarchy used in geocoding the dataset 100 (FIG. 1) or an associated result set in accordance with some embodiments. In some embodiments, a geographic hierarchy is represented as a star schema with a level table for each level in the hierarchy and a fact table that specifies map coordinates for geographical areas associated with the geographical hierarchy. FIGS. 2A and 2B are conceptual block diagrams of prophetic examples of level tables for respective levels in a geographic hierarchy in accordance with some embodiments. FIG. 2A illustrates a table 200 for a "State" level. Each record 210-1 through 210-5 in the table 200 corresponds to a distinct state. Fields in the table 200 include a row ID 202, a parent ID 204 that provides a link to the parent level table, a name field 206 that lists state names, and an abbreviation field 208 that lists two-letter state abbreviations. The table 200 may include additional fields for additional properties associated with the listed states. For example, since states also have longer abbreviations (e.g., "Cal," "Ill," etc.), the table 200 may include an additional abbreviation field for the longer abbreviations. FIG. 2B illustrates a table 220 for a "City" level. Each record 230-1 through 230-6 in the table 220 corresponds to a distinct city. Fields in the table 220 include a row ID 222, a parent ID 224 that provides a link to the parent level table, and a name field 226 that lists city names. The parent ID field 224 lists row IDs 202 in the state level table 200 for the state corresponding to each city in the city table 220. The table 220 may include additional fields for additional properties associated with the listed cities, such as abbreviations of city names.

FIG. 2C is a conceptual block diagram of a prophetic example of a fact table 240 for the geographical hierarchy that includes the level tables 200 (FIG. 2A) and 220 (FIG. 2B) in accordance with some embodiments. The fact table 240 includes records 250-1 through 250-6 that provide coordinates for respective cities listed in the city name field 226 of the records 230-1 through 230-6 of the table 220 (FIG. 2B). Specifically, the fact table 240 includes fields for latitude 246 and longitude 248, as well as a row ID field 242 and a Parent ID field 244 that provides a link to the most detailed level table in the geographical hierarchy (e.g., to a corresponding row ID 222 in the city level table 220 (FIG. 2B), if "City" is the most detailed level in the geographical hierarchy). The first record 250-1 of the fact table 240 provides latitude and longitude values for Chicago, which is the city specified by the value of the Parent ID field 244 of the first record 250-1, and so forth. Thus, if the name field 226 in the city level table 220 (FIG. 2B) is determined to correspond to a field in a dataset (e.g., to the city field 104 in the dataset 100, FIG. 1) or result set, the corresponding latitude and longitude values in the fields 246 and 248 of the fact table 240 may be used to geocode the dataset or result set. The fact table 240 also may include other arbitrarily defined fields that provide information about corresponding geographical areas. For example, a fact table that corresponds to the state level table 200 may include fields that specify state flags, state government URLs, and boundary polygons to be displayed in a map view.

In some embodiments, ambiguities occur when determining which latitude and longitude values in the fields 246 and 248 to add to a record in a dataset or result set. Ambiguity may result from multiple occurrences of a name: for example, two different countries may have identically named states. In some embodiments, once the most detailed geographical level has been identified for geocoding, one or more (e.g., all) parent level fields for the most detailed geographical level are added to the dataset or result set, to allow resolution of ambiguities. For example, if state is determined to be the most detailed level and is used for geocoding, a country field is added to the dataset or result set. If parent-level data (e.g., the country names) is not present, the ambiguity cannot be removed; however, the ambiguity may be arbitrarily resolved using heuristics. In some embodiments, the ambiguity is resolved in favor of the name with the largest number of children. For example, given identically named states, the state with the largest number of children (e.g., with the largest number of postal codes, if postal code is a child of state) is the default state to be used for geocoding.

In some embodiments, a geographical field identified as corresponding to a particular level may include values not listed in the level table for that level. This may occur, for example, in a field that a user specifies as a geographical field. The user may explicitly map values in the field to values in the level table (e.g., the user may specify that "Cal" corresponds to "California"). User-specified mappings may be stored in an appropriate data structure, such as a table or text file. In some embodiments, the geocoding software may attempt to identify correspondences between values. For example, the geocoding software may attempt to identify whether the field includes aliases for values in the level table.

FIG. 2D is a conceptual block diagram of a prophetic example of a table 260 that defines heuristics used to identify fields in a dataset or result set as geographical fields in accordance with some embodiments. The heuristics table 260 includes a record 272 for each level in each available geographical hierarchy. For example, the records 272-1 and 272-2 correspond to a state level in a hierarchy and the record 272-3 corresponds to a city level in a hierarchy. A row ID field 262 identifies each record 272 and a level field 264 provides the level corresponding to each record 272. A pattern field 266 describes a pattern that may be compared to metadata for respective fields in a dataset or result set to determine whether a particular field in the dataset or result set is a geographical field. A match indicates that the matching field may be a geographical field corresponding to the level 264 for a record 272 having a matching pattern 266. A data type field 268 specifies an expected data type (e.g., expected field formatting) to be compared against the data types (e.g., field formats) of dataset fields. A geographical field that corresponds to a particular level 264 should have the data type 268 specified in the corresponding record 272. For example, city or state fields should be strings and zip code fields should be integers. A width field 270 specifies a minimum width for a matching geographical field, or alternatively, a precise width for a matching geographical field. For example, a geographical field listing states should be wide enough to accommodate the names of each state, while a geographical field listing two-letter state abbreviations should have a width corresponding to two letters. In some embodiments, a determination that a field is a geographical field requires a successful match for all three heuristics fields (i.e., pattern 266, data type 268, and width 270).

In some embodiments, instead of or in addition to applying heuristics specified in the table 260 (FIG. 2D), a dataset or result set field may be sampled and the sampled values compared against known geographical areas. For example, the sampled values may be compared against geographical areas listed in various level tables (e.g., tables 200 and 220, FIGS. 2A-2B). If at least a predetermined percentage (e.g., 80%) of sampled values matches against geographical areas in a particular level table, the field is identified as a geographical table corresponding to the level of that level field. While the predetermined percentage may be 100%, use of a lower predetermined percentage allows identification of geographical fields that contain typographical errors (e.g., misspelled city or state names).

FIG. 2E illustrates an example of a result of geocoding a dataset in accordance with some embodiments. The dataset 130 shown in FIG. 2E corresponds to the dataset 100 (FIG. 1), with the addition of latitude and longitude fields 116 and 118. The values in the latitude and longitude fields 116 and 118 were determined by identifying the city field 104 as a geographical field corresponding to the city level table 220 (FIG. 2B) and then performing a join operation to add the appropriate latitude and longitude values from the fields 246 and 248 of the fact table 240 (FIG. 2C) to the dataset 100, resulting in the dataset 130.

FIG. 2F illustrates an example of a geocoded result set 280 in accordance with some embodiments. The result set 280 is generated from the dataset 100 (FIG. 1) by querying the dataset 100 for total inventory 284 by city 282 and adding latitude and longitude fields 286 and 288. The values in the latitude and longitude fields 116 and 118 were determined by identifying the city field 104 (FIG. 1) or 282 (FIG. 2F) as a geographical field corresponding to the city level table 220 (FIG. 2B) and then performing a join operation to add the appropriate latitude and longitude values from the fields 246 and 248 of the fact table 240 (FIG. 2C) to the result set 280.

Once the dataset 130 (FIG. 2E) or result set 280 (FIG. 2F) is geocoded, map views may be displayed. In some embodiments, a map view displays an aggregation of data in the dataset 130. For example, a sum or average of inventory 110 could be displayed by geographical area (e.g., for each city 104, state 106, or market 108). The sum or average could be calculated for each coffee type 112 or could be a total sum or average. For example, a map view of the inventory data 284 in the result set 280 (FIG. 2F) would correspond to an aggregation of total inventory data 110 for each city 104 in the dataset 130. A count of records for the combination of store ID 102 and a particular coffee type 118 could be displayed by geographical area, thus indicating the number of stores in each geographical area. Maximum or minimum inventory levels per store ID 102 could be displayed by geographical area. Alternatively, if the dataset 130 includes a single relevant record for each specified geographical area to be displayed in a map view, raw data from the dataset 130 may be displayed in the map view.

FIG. 3A is a screenshot of a user interface (UI) 300A for displaying geographical maps in accordance with some embodiments. More specifically, the user interface 300A enables the user to specify data (e.g., from the dataset 100 (FIG. 1) or 130 (FIG. 2E) or from the result set 280 (FIG. 2F)) to be displayed in one or more map views 320 and to specify how the data are to be displayed. In some embodiments, specifying data to be displayed includes specifying query terms for a query used to generate a result set (e.g., result set 280, FIG. 2F), the contents of which are then displayed in one or more map views. The UI 300A includes user input fields for specifying data to be displayed. In some embodiments, the user input fields are referred to as "shelves" and may include a "columns" shelf 302, a "rows" shelf 304, and a "level of detail" shelf 314. The UI 300A also includes user input fields for specifying the appearance of marks to be displayed in the one or more map views 320, including a mark text field 308, color field 310, and size field 312. In some embodiments, the UI 300A also includes a mark shape field (not shown), mark pattern field (not shown), mark edge/boundary field (not shown), and/or mark orientation field (not shown). Various data (e.g., values from fields in the dataset 130 or calculated values based on fields in the dataset 100 or 130, such as aggregations of data in fields in the dataset 100 or 130) may be assigned to the shelves 302, 304, and 314 and mark specification fields 308, 310, and 312. Assigning x-axis mapping coordinates such as longitude 301 to the columns shelf 302 and y-axis mapping coordinates such as latitude 303 to the rows shelf 304 indicates that a map view, as opposed to another type of graphical view, is to be generated. Additionally adding coffee type 112 to the columns shelf 302 indicates that two map views 320-1 and 320-2 are to be generated, one for each coffee type 112. Adding the quantity "SUM(Inventory)" 311, which is calculated from the inventory field 110 (FIG. 1 or 2E), to the mark size field 312 automatically specifies that the mark type is a symbol of variable size and that the size of each mark is to correspond to the "SUM (Inventory)" quantity 311. Adding "state" 106 to the level-of-detail shelf 314 specifies that the "SUM(Inventory)" quantity 311 is to be calculated on a per-state basis and that a separate mark is to be displayed for each state listed in the dataset 100 or 130.

In some embodiments, once the desired data have been specified in the appropriate shelves 302, 304, and 314 and mark specification fields 308, 310, and 312, the user may issue an instruction to generate the map views 320-1 and 320-2. For example, the user may select a "generate map" or "run query" icon (not shown) or an instruction from a drop-down menu (not shown). Alternatively, in some other embodiments a map view or other type of graphical display is automatically generated every time the content of a shelf or mark specification field is modified. In some embodiments, the displayed geographical map in each map view 320 is selected based on the geographical area or areas specified on the level-of-detail shelf 314 and listed in the dataset 130. For example, in the UI 300A, maps of the United States are displayed, since "State" 106, which corresponds to states of the United States as listed in the dataset 100 or 130, is specified on the level-of-detail shelf 314. A mark 322 is displayed for each state for which the dataset 100 or 130 includes inventory data. The size of each mark 322 corresponds to the quantity "SUM(Inventory)" 311, as illustrated in the key 324.

In this example, the size of each mark is proportional to the quantity "SUM(Inventory)" 311, such that mark sizes increase with increasing values of "SUM(Inventory)" 311.

In some embodiments, the user does not need to add longitude 301 to the columns shelf 302 and latitude 303 to the rows shelf 304 to specify that a map view is to be generated. Instead, if an identified geographical field (e.g., "State" 106) is added to the level-of-detail shelf 314, the system assumes that a map view is to be generated and automatically uses longitude 301 and latitude 303 to generate the map view.

Figure 3B:
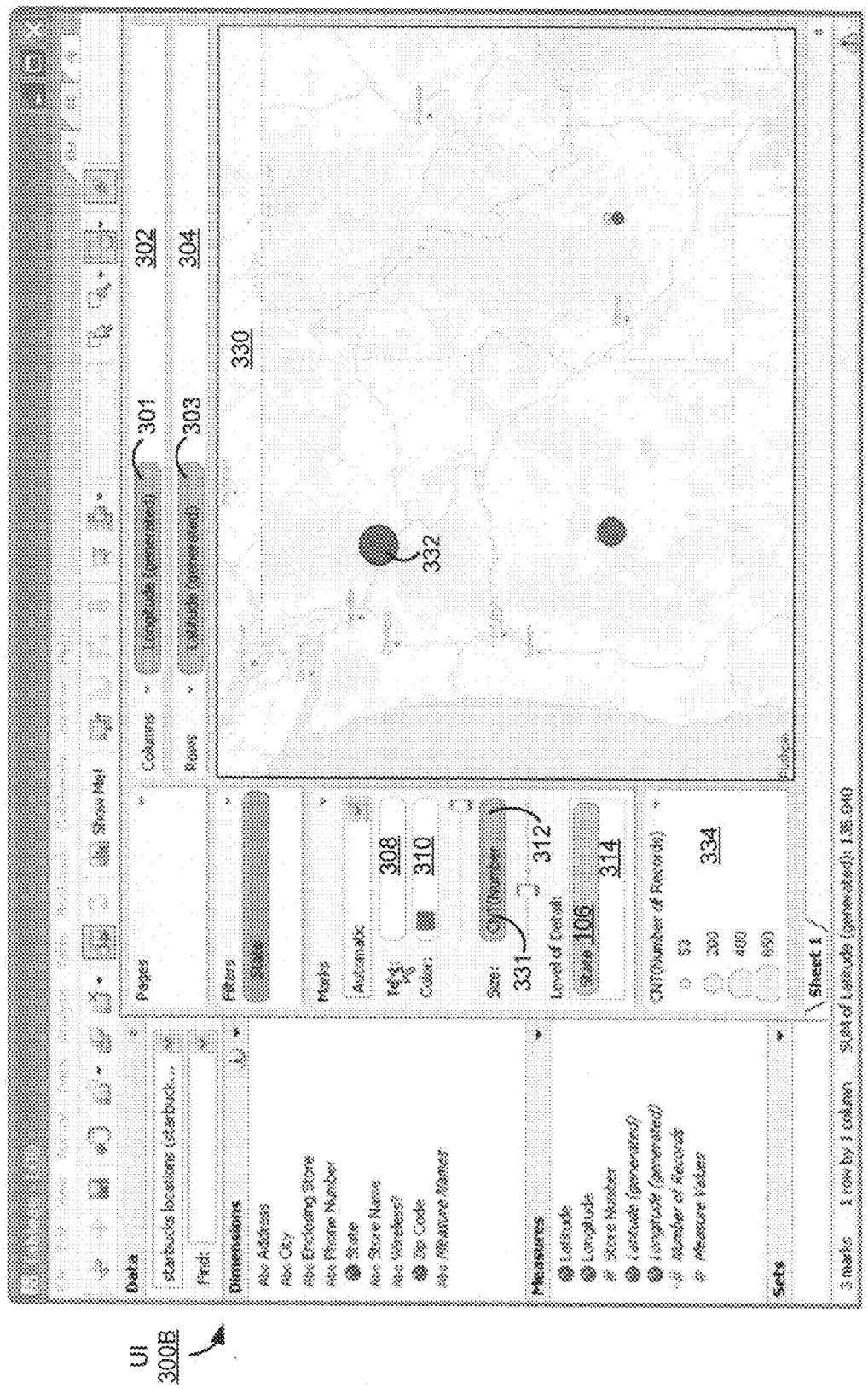
Figure 3C:
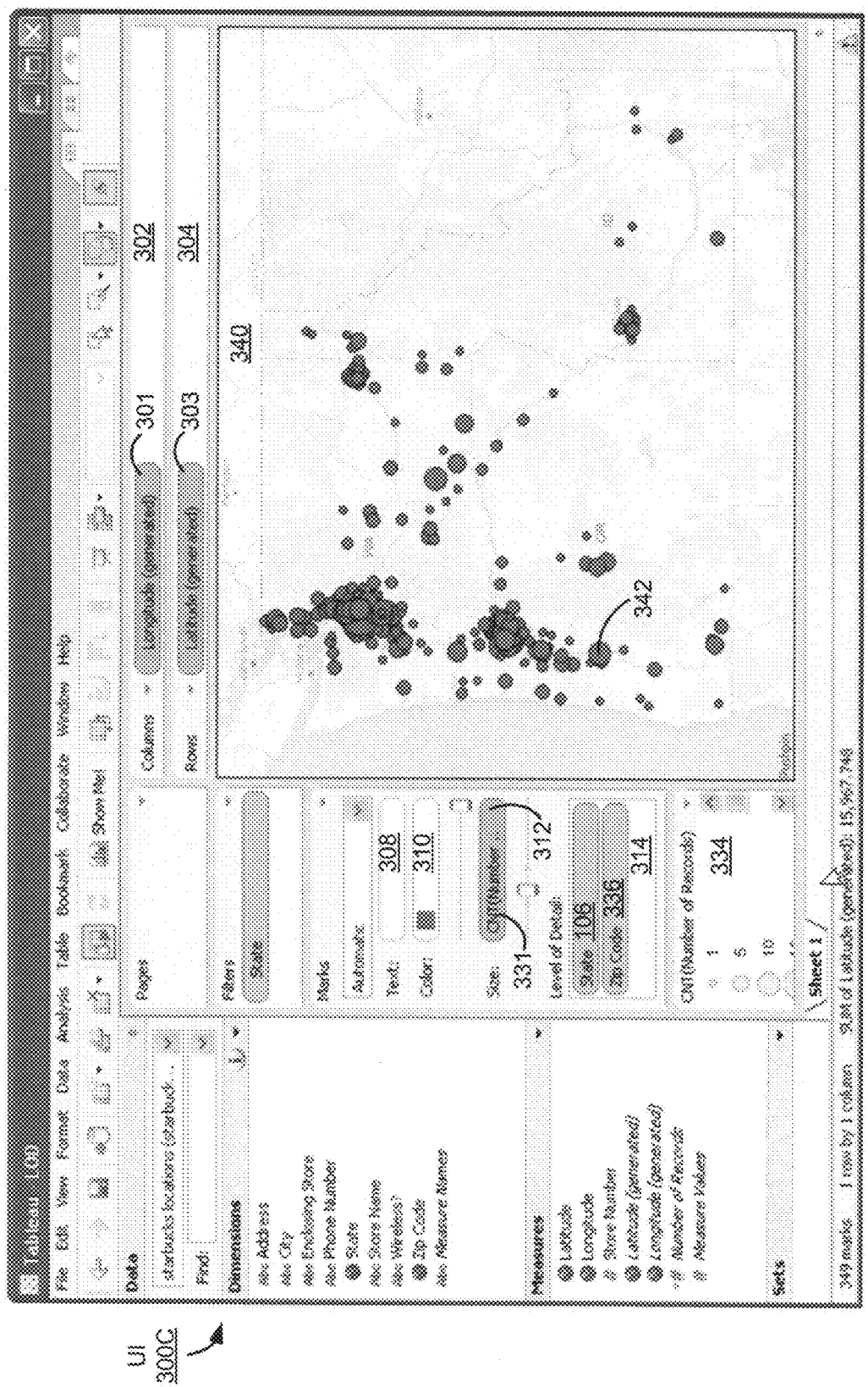

If a dataset includes multiple identified geographical fields (e.g., market 108, state 106, and city 104 in the dataset 100, FIG. 1, or 130, FIG. 2E), the level of geographical detail in a map view may be varied by modifying the contents of the level of detail shelf 314 or other appropriate user input field. FIGS. 3B and 3C illustrate respective UIs 300B and 300C that display successively generated map views 330 (FIG. 3B) and 340 (FIG. 3C) with varied levels of geographical detail. In the UI 300B, the quantity "CNT(Number of Records)" 331 has been added to the mark size field 312 and "State" 106 has been added to the level of detail shelf 314. In response, a result set listing counts of records by state is generated from an appropriate dataset and the map view 330 is displayed based on the result set. In the map view 330, a mark 332 is displayed for each state, with a mark size proportional to the quantity "CNT(Number of Records)" 331 for each state, as shown in the key 334. An updated map view with a different level of geographical detail may be generated by modifying the contents of the level of detail shelf 314. For example, in the UI 300C (FIG. 3C), "ZIP Code" field 336 has been added to the level of detail shelf 314. In response, a new result set listing counts of records by state and zip code is generated from the dataset and the map view 340 is displayed based on the result set. In the map view 340, a mark 342 is displayed for each zip code, with a mark size proportional to the quantity "CNT (Number of Records)" 331 for each zip code, as shown in the key 334.

In some embodiments, a user may transition between a map view and another type of graphical display. For example, a user viewing the map views 340-1 and 340-2 in UI 300B (FIG. 3B) may desire to view a chart (e.g., a bar chart) of inventory by state instead. In some embodiments, this transition is achieved by modifying the sets of data samples specified in the columns shelf 302 and rows shelf 304. For example, this transition may be achieved by deleting longitude 301 from the columns shelf 302 and latitude 303 from the rows shelf 304.

Figure 4:
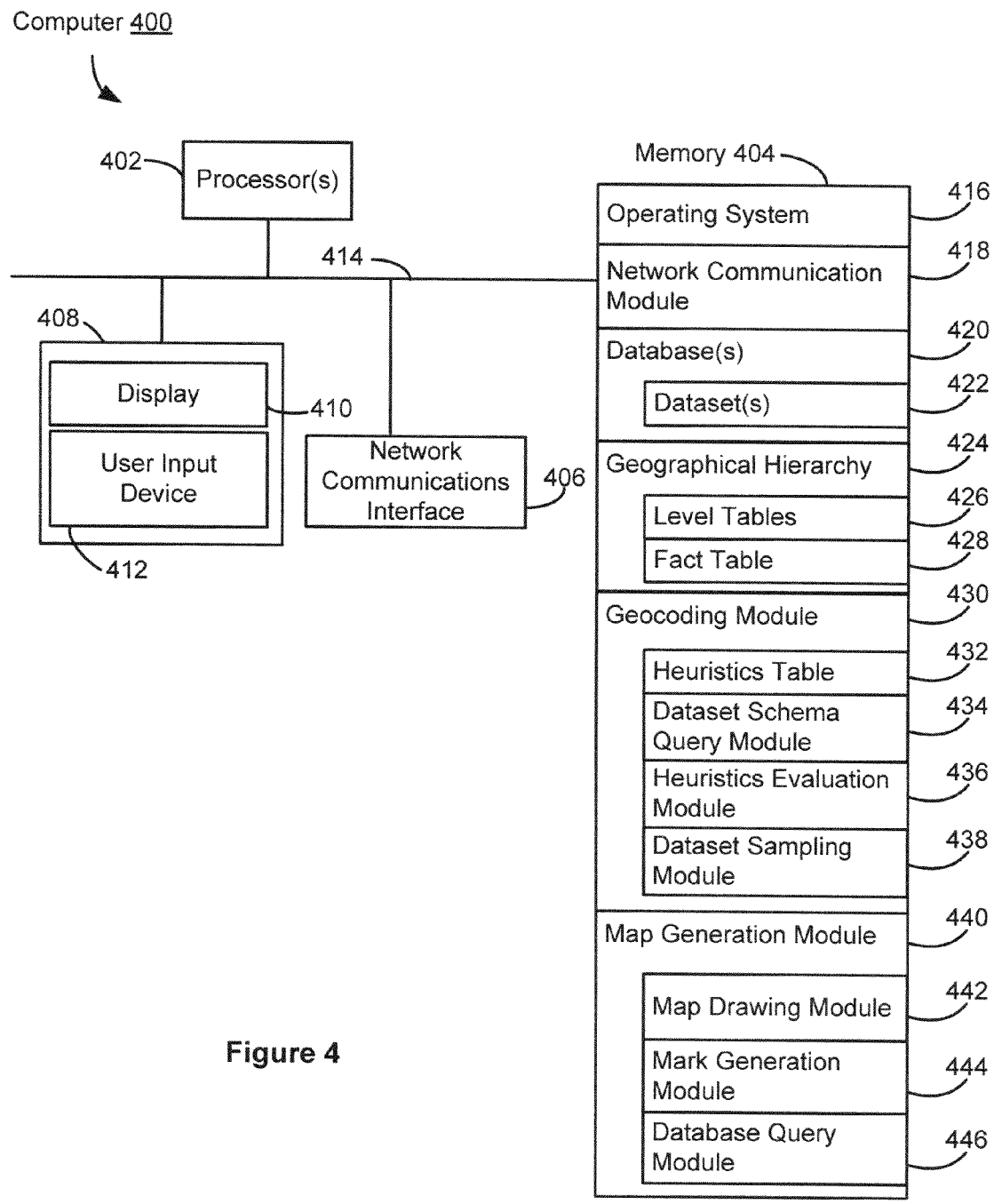
FIG. 4 is a block diagram illustrating a computer system for generating a map view in accordance with some embodiments.

FIG. 4 is a block diagram illustrating a computer system 400 for generating a map view in accordance with some embodiments. The computer system 400 typically includes one or more processors 402, one or more network or other communications interfaces 406, memory 404, and one or more communication buses 414 for interconnecting these components. The one or more network or other communications interfaces 406 allow transmission and reception of data and instructions through a network connection. The communication buses 414 may include circuitry (sometimes called a chipset) that interconnects and controls communications between system components. The computer system 400 may also include interface devices 408, such as a display device 410 and a user input device 412. User interface images (e.g., UI 300A-C, FIGS. 3A-3C) may be displayed on the display device 410 under the control of the map generation module 440, described below. Examples of user input devices 412 include a keyboard, mouse, trackball, touchpad, or touch screen. Memory 404 includes high-speed random access memory, such as DRAM, SRAM, DDR RAM or other random access solid-state memory devices, and may include non-volatile memory, such as one or more magnetic disk storage devices, optical disk storage devices, flash memory devices, or other non-volatile solid-state storage devices. Memory 404 may optionally include one or more storage devices remotely located from the processor(s) 402. Memory 404, or alternately the non-volatile memory device(s) within memory 404, comprises a computer readable storage medium. In some embodiments, memory 404 stores the following programs, modules, and data structures, or a subset thereof:

- an operating system 416 that includes procedures for handling various basic system services and for performing hardware-dependent tasks;
- a network communication module 418 that is used for connecting the computer system 400 to other computers via the one or more communication network interfaces 406 and one or more communication networks, such as the Internet, wide area networks, local area networks, metropolitan area networks, and the like;
- one or more databases 420 that include one or more datasets 422 having multiple records and multiple fields (e.g., one or more datasets 100, FIG. 1, and/or datasets 130, FIG. 2E);
- one or more geographical hierarchies 424;
- a geocoding module 430 for adding location fields to a dataset 422 or corresponding result set; and
- a map generation module 440 for generating map views based on data from a geocoded dataset 422 or result set.

In some embodiments, one or more databases 420 are stored externally to the computer system 400. For example, the database 420 may be stored on a server in communication with the computer system 400 through a network. A dataset 422 accessed from a server may be cached in the memory 404.

In some embodiments, a dataset is distributed among multiple databases 420.

In some embodiments, a respective geographical hierarchy 424 includes level tables (e.g., tables 200 & 220, FIGS. 2A-2B) and a fact table (e.g., table 240, FIG. 2C).

In some embodiments, the geocoding module 430 includes a heuristics table 432 (e.g., a heuristics table 260, FIG. 2D), a dataset schema query module 434 for querying a dataset schema for metadata specifying geographic fields, a heuristics evaluation module 436 for applying heuristics specified in the heuristics table 432 to identify geographical fields, and a dataset sampling module 438 for sampling contents of dataset fields and comparing the samples to known geographical areas to identify geographical fields.

In some embodiments, the map generation module 440 includes a map drawing module 442 for selecting and generating a geographical map for display; a mark generation module 444 for determining mark types, appearances, and locations and generating corresponding marks on the geographical map; and a database query module 446 for querying a dataset 422 for data to display.

In some embodiments, instructions corresponding to all or a portion of the map generation module 440 and/or geocoding module 430 are stored at and executed by a server that transmits the results to the computer system 400 for display.

Figure 5A:
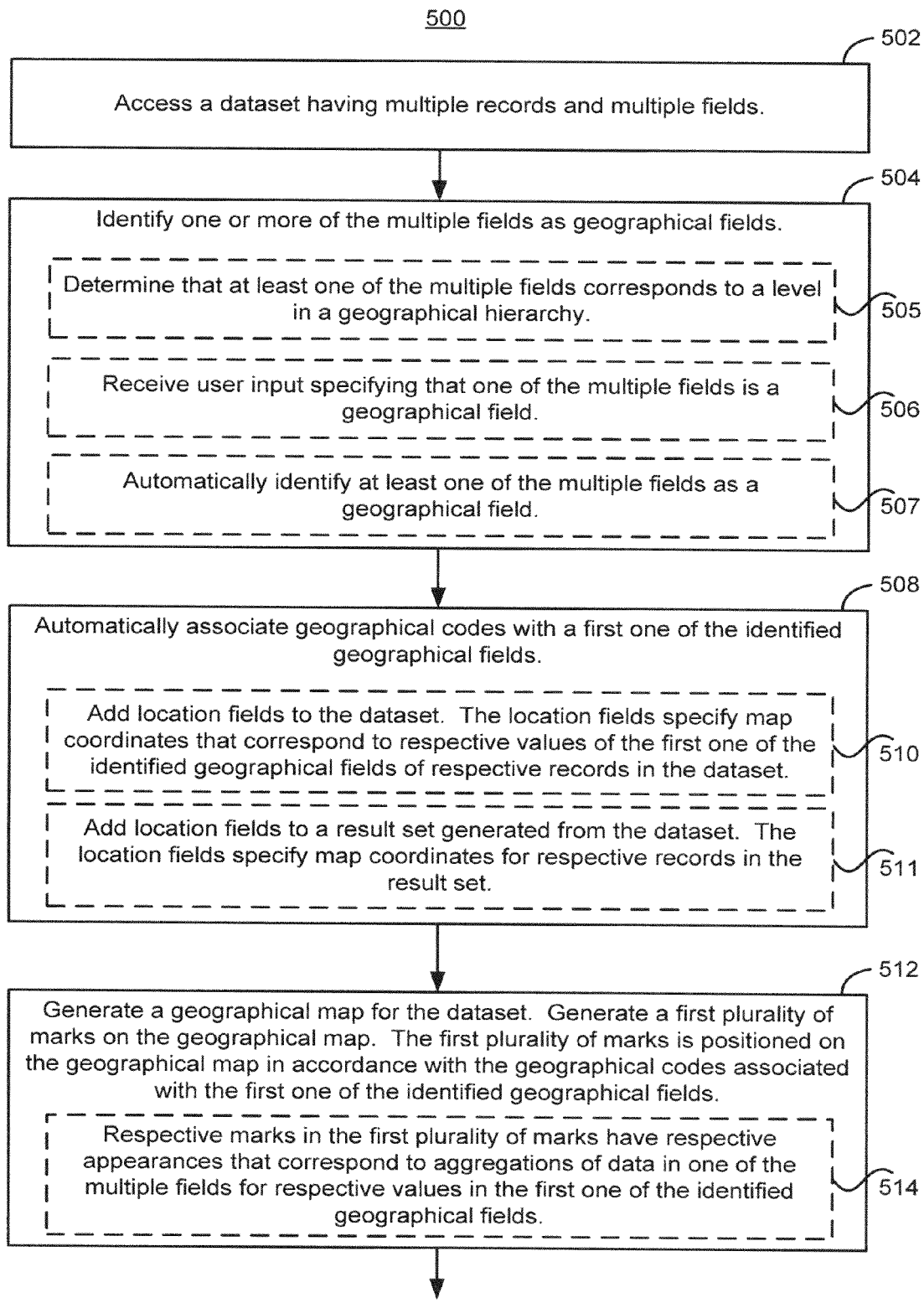
FIGS. 5A and 5B are flow diagrams illustrating a method of generating a map view in accordance with some embodiments.
Figure 5B:
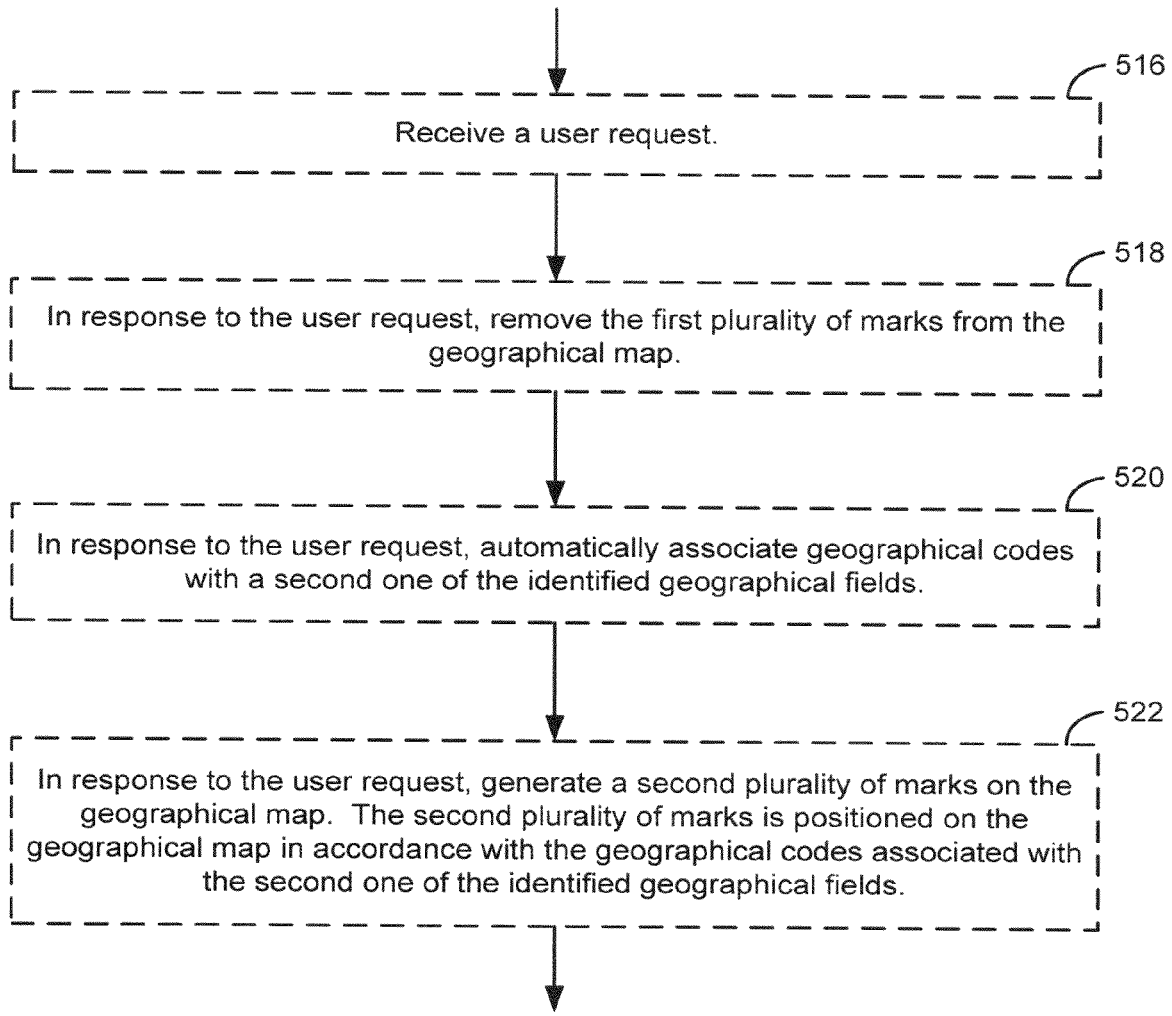

In some embodiments, the combination of the geocoding module 430 and the map generation module 440 includes instructions to perform the method 500 (FIGS. 5A-5B, below).

Each of the above identified elements 416-446 in FIG. 4 may be stored in one or more of the previously mentioned memory devices. Each of the above identified modules corresponds to a set of instructions for performing a function described above. The above identified modules or programs (i.e., sets of instructions) need not be implemented as separate software programs, procedures, or modules, and thus various subsets of these modules (or sets of instructions) may be combined or otherwise re-arranged in various embodiments. In some embodiments, memory 404 may store a subset of the modules and data structures identified above. Furthermore, memory 404 may store additional modules and data structures not described above.

FIGS. 5A and 5B are flow diagrams illustrating a computer-implemented method 500 of generating map views in accordance with some embodiments. In some embodiments, the method 500 is performed at a computer system 400 (FIG. 4) by executing instructions associated with the geocoding module 430 and map generation module 440. Alternatively, some operations in the method 500 are performed at a server in communication with the computer system 400.

In the method 500, a dataset having multiple records and multiple fields (e.g., a dataset 100, FIG. 1; a dataset 422, FIG. 4) is accessed (502).

One or more of the multiple fields are identified (504) as geographical fields.

In some embodiments, at least one of the multiple fields is determined (505) to correspond to a level in a geographical hierarchy.

In some embodiments, user input is received (506) specifying that one of the multiple fields is a geographical field. For example, the user may specify that a field is geographical through a dialog initiated by right-clicking on a listed field in a user interface or by selecting a command from a drop-down menu.

In some embodiments, at least one of the multiple fields is automatically identified (507) as a geographical field. In some embodiments, automatically identifying at least one of the multiple fields as a geographical field includes querying a schema of the dataset for metadata (e.g., semantic metadata) specifying a geographical field. For example, an Application Programming Interface (API) call may be performed to query the dataset for metadata specifying a geographical field. In some embodiments, automatically identifying at least one of the multiple fields as a geographical field further includes determining that the metadata specifying the geographical field corresponds to a level in a geographical hierarchy. For example, the name of a field may match a pattern specified in the pattern field 266 of the heuristics table 260 (FIG. 2D), indicating that the field corresponds to a level associated with the matching pattern.

In some embodiments, automatically identifying at least one of the multiple fields as a geographical field includes taking a sample (e.g., a random sample) of values in at least one of the multiple fields and verifying that at least a predefined percentage (e.g., 80%) of the sample (i.e., of the sampled values) corresponds to geographical areas. For example, the sampled values may be compared to geographical areas listed in level tables (e.g., the state level table 200, FIG. 2A, and the city level table 220, FIG. 2B). Determining that a predefined percentage of the sampled values matches areas listed in a particular level table indicates that the sampled field corresponds to the level associated with the level table.

In some embodiments, automatically identifying at least one of the multiple fields as a geographical field includes verifying that the field has an expected data type and a width at least as wide as a specified minimum width or, alternatively, equal to a specified width. The data type and width may be specified, for example, in the data type field 268 and width field 270 of the heuristics table 260 (FIG. 2D). In some embodiments, this verification is performed in addition to other operations for identifying geographical fields. For example, this verification can be performed for a field identified by querying the dataset for metadata specifying a geographical field. In another example, this verification can be performed for a field identified by taking a sample of values and verifying that at least a predefined percentage of the sample corresponds to geographic areas. Alternatively, verification of data type and width can be performed to identify potential geographical fields for sampling.

One or more geographical codes are automatically associated (508) with a first one of the identified geographical fields.

In some embodiments, location fields are added (510) to the dataset. The location fields specify map coordinates that correspond to respective values of the geographical field of respective records in the dataset. An example of location fields is latitude and longitude fields (e.g., latitude field 116 and longitude field 118, FIG. 2E). In some embodiments, the map coordinates correspond to geographical areas for a level in a geographical hierarchy. For example, the latitude field 116 and longitude field 118 correspond to a "City" level in a geographical hierarchy, as described in the city level table 220 (FIG. 2B). In some embodiments, adding the location fields to the dataset includes performing a join operation with a table (e.g., the fact table 240, FIG. 2C) that includes location fields for geographical areas (e.g., cities listed in the city level table 220, FIG. 2B) that correspond to values in the geographical field (e.g., city field 104, FIG. 1) of respective records (e.g., records 122, FIG. 1) in the dataset.

In some embodiments, location fields are added (511) to a result set (e.g., result set 280, FIG. 2F) generated from the dataset. The location fields specify map coordinates for respective records in the result set. In some embodiments, the result set is generated by querying the dataset. In some embodiments, the location fields include a latitude field and a longitude field (e.g., fields 286 and 288, FIG. 2F). In some embodiments, the map coordinates specified in the location fields added to the result set correspond to geographical areas for a level in a geographical hierarchy. In some embodiments, adding the location fields to the result set includes performing a join operation with a table (e.g., the fact table 240, FIG. 2C) that includes location fields for geographical areas (e.g., cities listed in the city level table 220, FIG. 2B).

In some embodiments, identified geographical fields correspond to respective levels in a geographical hierarchy and the first one of the identified geographical fields corresponds to a respective level having a greatest level of detail of the respective levels. In some embodiments, identified geographical fields have respective detail numbers and the first one of the identified geographical fields has a highest detail number of the respective detail numbers, indicating that the first one of the identified geographical fields is the most relevant geographical field.

A geographical map (e.g., the maps in map views 320-1 and 320-2, FIG. 3A, map view 330, FIG. 3B, or map view 340, FIG. 3C) is generated (512) for the dataset. A first plurality of marks (e.g., marks 322, FIG. 3A; marks 332, FIG. 3B) is generated on the geographical map. The first plurality of marks is positioned on the geographical map in accordance with the geographical codes (e.g., values in the latitude field 116 and longitude field 118, FIG. 2E, or in the latitude field 286 and longitude field 288, FIG. 2F) associated with the first one of the identified geographical fields. In some embodiments, respective marks in the first plurality of marks have respective appearances that correspond (514) to aggregations of data in one of the multiple fields for respective values in the first one of the geographical fields. For example, in the map views 320-1 and 320-2 (FIG. 3A), the size of the marks 322 is proportional to corresponding values of the quantity "SUM (Inventory)" 311 for respective states. In the map view 330 (FIG. 3B), the size of the marks 332 is proportional to corresponding values of the quantity "CNT(Number of Records)" 334 for respective states.

In some embodiments, a user request is received (516, FIG. 5B). For example, a user viewing the UI 300B (FIG. 3B) may add "Zip Code" 336 to the level of detail shelf 314, as shown in the UI 300C (FIG. 3C).

In response to the user request, the first plurality of marks is removed (518) from the geographical map. For example, in the UI 300C (FIG. 3C), the marks 332 from UI 300B (FIG. 3B) have been deleted. Geographical codes are automatically associated (520) with a second one of the identified geographical fields (e.g., a zip code field 336, FIG. 3C). A second plurality of marks (e.g., marks 342, FIG. 3C) is generated on the geographical map. The second plurality of marks is positioned (522) on the geographical map in accordance with the geographical codes associated with the second one of the identified geographical fields. For example, in FIG. 3C, each mark is positioned in accordance with coordinates for a corresponding zip code.

The method 500 provides a user-friendly way to generate a map view from a dataset that is not geocoded, and thus spares users from having to geocode data explicitly. In some embodiments, the method 500 also provides a user-friendly way to vary the level of geocoding in a map view. While the method 500 includes a number of operations that appear to occur in a specific order, it should be apparent that the method 500 can include more or fewer operations, which can be executed serially or in parallel (e.g., using parallel processors or a multi-threading environment), an order of two or more operations may be changed, and/or two or more operations may be combined into a single operation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of generating a map view, comprising:
   accessing a dataset having multiple records and multiple fields;
   automatically, without user input, identifying at least one of the multiple fields as a geographical field, wherein the identifying includes taking a sample of values in at least one of the multiple fields and verifying that at least a predefined amount of the sample corresponds to geographical areas;
   determining a level of the geographical field in a geographical hierarchy;
   automatically, without user input, associating the geographical field with its corresponding level in the geographical hierarchy;
   automatically, without user input, associating geographical coordinates with values of the geographical field; and
   generating a geographical map for the dataset, including generating a first plurality of marks on the geographical map, wherein respective marks in the first plurality of marks are positioned on the geographical map in accordance with the geographical coordinates associated with the values and a level of detail corresponding to the level in the geographical hierarchy of the geographical field, wherein the level of detail is selected by a user.

2. The computer-implemented method of claim 1, wherein automatically identifying at least one of the multiple fields as a geographical field comprises:
   querying a schema of the dataset for metadata specifying a geographical field.

3. The computer-implemented method of claim 2, wherein the metadata is semantic metadata.

4. The computer-implemented method of claim 2, wherein querying the schema of the dataset for metadata specifying the geographical field comprises: performing an Application Programming Interface (API) call.

5. The computer-implemented method of claim 2, wherein determining a level of the geographical field in a geographical hierarchy further comprises:
   determining that the metadata specifying the geographical field corresponds to a level in a geographical hierarchy.

6. The computer-implemented method of claim 2, wherein automatically identifying at least one of the multiple fields as a geographical field further comprises:
   verifying that the geographical field specified by the metadata has an expected data type and a width at least as wide as a specified minimum width.

7. The computer-implemented method of claim 1, wherein the sample is a random sample.

8. The computer-implemented method of claim 1, wherein automatically identifying at least one of the multiple fields as a geographical field comprises:
   verifying that at least one of the multiple fields has an expected data type and a width at least as wide as a specified minimum width.

9. The computer-implemented method of claim 1, wherein the geographical hierarchy has a plurality of levels; and
   the level of the geographical field corresponds to a level having a greatest level of detail of the plurality of levels.

10. The computer-implemented method of claim 1, wherein:
    the geographical field has a detail numbers corresponding to a highest detail number of a plurality of respective detail numbers.

11. The computer-implemented method of claim 1, wherein automatically associating geographical codes coordinates with values of the geographical field comprises:
    adding location fields to the dataset, the location fields specifying map coordinates that correspond to respective values of the geographical field of respective records in the dataset.

12. The computer-implemented method of claim 11, wherein the location fields include a latitude field and a longitude field.

13. The computer-implemented method of claim 11, wherein adding the location fields to the dataset comprises:
    performing a join operation with a table that includes the location fields.

14. The computer-implemented method of claim 11, wherein
    the map coordinates specified in the location fields added to the dataset correspond to geographical areas for the level in the geographical hierarchy.

15. The computer-implemented method of claim 1, wherein automatically associating geographical coordinates with values of the geographical field comprises:

adding location fields to a result set generated from the dataset, the location fields specifying map coordinates for respective records in the result set.

16. The computer-implemented method of claim 15, wherein the result set is generated by querying the dataset.

17. The computer-implemented method of claim 15, wherein the location fields include a latitude field and a longitude field.

18. The computer-implemented method of claim 15, wherein adding the location fields to the result set comprises:
performing a join operation with a table that includes the location fields.

19. The computer-implemented method of claim 15, wherein
the map coordinates specified in the location fields added to the result set correspond to geographical areas for the level in the geographical hierarchy.

20. The computer-implemented method of claim 1, wherein respective marks in the first plurality of marks have respective appearances that correspond to aggregations of data in one of the multiple fields for respective values in the geographical field.

21. The computer-implemented method of claim 1, wherein the geographical field is a first geographical field, the method further comprising:
receiving a user request; and
in response to the user request:
removing the first plurality of marks from the geographical map;
automatically associating geographical codes coordinates with values of a second geographical field; and
generating a second plurality of marks on the geographical map, wherein respective marks of the second plurality of marks are positioned on the geographical map in accordance with the geographical coordinates associated with the second geographical field.

22. The computer-implemented method of claim 21, wherein:
respective marks in the first plurality of marks have respective appearances that correspond to aggregations of data in one of the multiple fields for respective values in the first geographical field; and
respective marks in the second plurality of marks have respective appearances that correspond to aggregations of data in one of the multiple fields for respective values in the second geographical field.

23. A system for generating a map view, the system comprising:
one or more processors; and
memory storing one or more programs configured for execution by the one or more processors, the one or more programs comprising:
instructions to access a dataset having multiple records and multiple fields;
instructions to automatically identify at least one of the multiple fields as a geographical field without user input, the instructions to identify being configured to take a sample of values in at least one of the multiple fields and verify that at least a predefined amount of the sample corresponds to geographical areas;
instructions to determine a level of the geographical field in a geographical hierarchy;
instructions to automatically associate the geographical field with its corresponding level in the geographical hierarchy without user input;
instructions to automatically associate geographical coordinates with values of the geographical field without user input; and
instructions to generate a geographical map for the dataset, including instructions to generate a first plurality of marks on the geographical map, wherein respective marks in the first plurality of marks are positioned on the geographical map in accordance with the geographical coordinates associated with the values and a level of detail corresponding to the level in the geographical hierarchy of the geographical field, wherein the level of detail is selected by a user.

24. A non-transitory computer readable storage medium storing one or more programs for use in generating a map view, the one or more programs configured to be executed by a computer system and comprising:
instructions to access a dataset having multiple records and multiple fields;
instructions to automatically identify at least one of the multiple fields as a geographical field without user input, the instructions to identify being configured to take a sample of values in at least one of the multiple fields and verify that at least a predefined amount of the sample corresponds to geographical areas;
instructions to determine a level of the geographical field in a geographical hierarchy;
instructions to automatically associate the geographical field with its corresponding level in the geographical hierarchy without user input;
instructions to automatically associate geographical coordinates with values of the geographical field without user input; and
instructions to generate a geographical map for the dataset, including instructions to generate a first plurality of marks on the geographical map, wherein respective marks in the first plurality of marks are positioned on the geographical map in accordance with the geographical coordinates associated with values and a level of detail corresponding to the level in the geographical hierarchy of the geographical field, wherein the level of detail is selected by a user.

* * * * *

UNITED STATES PATENT AND TRADEMARK OFFICE
CERTIFICATE OF CORRECTION

PATENT NO. : 8,306,971 B2  
APPLICATION NO. : 12/214659  
DATED : November 6, 2012  
INVENTOR(S) : Stolte et al.

Page 1 of 1

It is certified that error appears in the above-identified patent and that said Letters Patent is hereby corrected as shown below:

In the Claims:

In column 14, line 43, please delete "numbers" and add -- number --;

In column 14, line 47, please delete "codes"; and

In column 15, line 30, please delete "codes".

Signed and Sealed this  
Twenty-seventh Day of August, 2013

Teresa Stanek Rea  
*Acting Director of the United States Patent and Trademark Office*